United States Patent
Watanabe

(10) Patent No.: US 8,424,081 B2
(45) Date of Patent: Apr. 16, 2013

(54) DISK UNIT, MAGNETIC DISK UNIT AND INFORMATION STORAGE UNIT

(75) Inventor: Yoshiju Watanabe, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 1689 days.

(21) Appl. No.: 11/650,328

(22) Filed: Jan. 5, 2007

(65) Prior Publication Data

US 2007/0192852 A1 Aug. 16, 2007

(30) Foreign Application Priority Data

Jan. 6, 2006 (JP) .................................. 2006-001832

(51) Int. Cl.
*G06F 12/14* (2006.01)

(52) U.S. Cl.
USPC .............................................. 726/21; 726/17

(58) Field of Classification Search ................ 380/270, 380/255, 247; 713/150, 100, 182, 188, 189; 726/26, 27, 28, 29, 30
See application file for complete search history.

(56) References Cited

U.S. PATENT DOCUMENTS

| | | | |
|---|---|---|---|
| 6,286,087 B1 | 9/2001 | Ito et al. | |
| 2004/0199639 A1 | 10/2004 | Harris | |
| 2005/0246765 A1* | 11/2005 | Utsumi et al. | 726/5 |
| 2007/0300287 A1* | 12/2007 | Wynne et al. | 726/2 |

FOREIGN PATENT DOCUMENTS

| | | |
|---|---|---|
| JP | 54-53509 A | 4/1979 |
| JP | 57150117 | 9/1982 |
| JP | 07044464 | 2/1995 |
| JP | 2003132624 | 5/2003 |
| JP | 2004086337 | 3/2004 |
| WO | PCT 2004/086228 A1 | 10/2004 |

OTHER PUBLICATIONS

European Patent Office (EPO) search report dated Feb. 19, 2008 for EPO application EP06024043.9.

* cited by examiner

*Primary Examiner* — Brandon Hoffman
*Assistant Examiner* — Nega Woldemariam

(57) ABSTRACT

Embodiments in accordance with the present invention provide a disk unit capable of restricting access to data stored in the recording medium depending on users. In one embodiment, the user enters a password into a host computer. This password is transferred to a password verification section. Then, the password verification section checks whether the password coincides with any one of authentication passwords stored in an authentication password storage section. If the password coincides with any one of the passwords, the password verification section supplies an authentication signal to an operation mode control section. The operation mode control section supplies an operation mode signal to a controller by receiving the authentication signal. The controller controls execution of the operation mode according to the operation mode signal.

11 Claims, 11 Drawing Sheets

DISK UNIT, MAGNETIC DISK UNIT AND INFORMATION STORAGE UNIT

CROSS-REFERENCE TO RELATED APPLICATION

The instant nonprovisional patent application claims priority to Japanese Application No. 2006-001832, filed Jan. 6, 2006 and incorporated by reference herein for all purposes.

BACKGROUND OF THE INVENTION

Embodiments in accordance with the present invention relate to disk units, magnetic disk units and information storage units such as hard disk drive units.

Disk units including hard disk drive units are being used in a wide variety of fields. In recent years, particularly, hard disk drive units are being used in various information processing systems as represented by personal computers. Such hard disk drive units allow a user to record content including movies and music and play the content recorded in the hard disk drive unit in advance.

In the case where a hard disk drive unit in which content is stored is lent at a rental agency, a lender requests to prevent illegal actions from being taken by a borrower. The above illegal actions include storing other content in the hard disk drive unit and deleting the content pre-stored in the hard disk drive unit. In addition, the lender requests to prevent the hard disk drive unit from being accessed by a third party other than the borrower without any permission.

In addition, in the case where confidential information is leaked from the hard disk drive unit due to illegal access to an information processing system, it is requested to prevent records such as access logs from being falsified. Otherwise, it is not possible to legally clarify the illegal access.

Further, in a system where images from a security video camera are recorded in a hard disk drive unit, there is a request for limiting users who can access the images (recorded data) for private information protection.

In the above-mentioned conventional technique, however, these requests cannot be accomplished since the hard disk drive unit allows a plurality of operation modes to be performed. The operation modes include recording content therein, playing content therefrom and recording content while playing it.

BRIEF SUMMARY OF THE INVENTION

Embodiments in accordance with the present invention provide a disk unit capable of restricting access to data stored in the recording medium depending on users. In accordance with the particular embodiment shown in FIG. 1, the user enters a password into a host computer 100. This password is transferred to a password verification section 20. Then, the password verification section checks whether the password coincides with any one of the authentication passwords 11 through 13 stored in an authentication password storage section 10. If the password coincides with any one of the passwords, the password verification section 20 supplies an authentication signal to an operation mode control section 30. The operation mode control section 30 supplies an operation mode signal to a controller 50 by receiving the authentication signal. The controller 50 controls execution of the operation mode according to the operation mode signal.

DETAILED DESCRIPTION OF THE INVENTION

An object of embodiments in accordance with the present invention is to provide a disk unit, a magnetic disk unit, and an information storage unit in which such operations as access to data stored on a recording medium, can be restricted depending on users.

Embodiments of the present invention provide an information storage unit such as a disk unit. The information storage unit comprises: a recording medium; a control device which controls operation modes for reading from and writing to the recording medium; and an authentication storage section for storing authentication information wherein each operation mode is given unique authentication information; wherein the control device comprises: a verification section which reads out the authentication information from the authentication storage section and determines whether or not the authentication information coincides with input information input through an interface by using a predefined method; an operation mode control section for outputting an operation mode signal in response to an authentication signal input from the authentication storage section when the authentication information coincides with the input information; and a controller for controlling execution of an operation mode corresponding to an operation mode signal input from the operation mode control section.

In such a configuration described above, if input information is entered by a user, the verification section of the control device determines whether the input information coincides with the authentication information stored in the verification section using the predefined method. If the input information coincides with the authentication information, the verification section supplies the corresponding operation mode signal to the operation mode control section of the control device. Consequently, the controller in the control device controls execution of an operation mode associated with the operation mode signal supplied from the operation mode control section. Thus, it is possible to limit the operation modes which the user is allowed to use when accessing the disk unit.

With reference to the attached drawings FIGS. 1 through 12, a detailed description will be provided in the case of a hard disk drive unit applied to the disk unit of embodiments in accordance with the present invention. First, a hard disk drive unit according to a first embodiment will be described in detail with reference to FIGS. 1 and 2.

Figure 1:
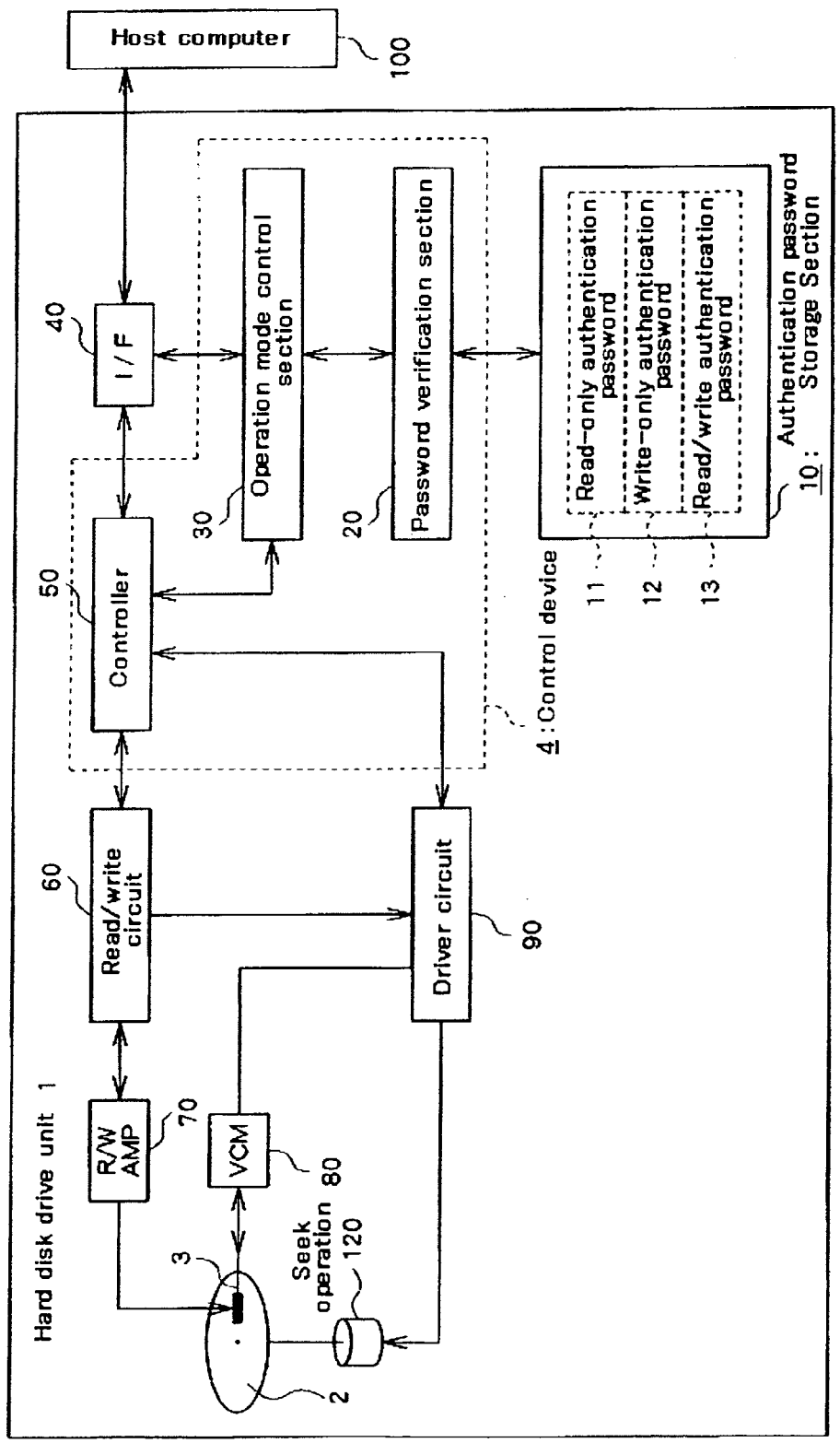
FIG. 1 shows a block diagram of a hard disk drive unit according to a first embodiment of the present invention.

As shown in FIG. 1, a hard disk drive unit 1 according to the present embodiment includes a magnetic disk 2 which is a recording medium, a head assembly 3, a control device 4, and an authentication password storage section 10 which is an authentication storage section. The control device 4 includes a password verification section 20 which is a verification section, an operation mode control section 30, and a controller 50. The control device 4 controls the operation modes (read-only operation mode, write-only operation mode and read/write operation mode) which are performed by the head assembly 3 on the magnetic disk 2.

The authentication password storage section 10 is constituted by, for example, a flash memory. In this flash memory, a read-only authentication password 11 for the read-only operation mode, a write-only authentication password 12 for the write-only operation mode and a read/write authentication password 13 for the read/write operation mode are stored. Note that the read-only authentication password 11, the write-only authentication password 12 and the read/write authentication password 13 (hereinafter referred collectively to as the authentication passwords 11 through 13) correspond to "authentication information" described in "Claims". The authentication passwords 11 through 13 can be stored in the authentication password storage section 10 by preparing an authentication password setting command or the like and executing the command. To prevent the authentication passwords from being illegally accessed and falsified, the configuration of the authentication password storage section 10 and that of the control device 4 should be tamper-resistant.

The password verification section 20 reads out the authentication passwords 11 through 13 from the authentication password storage section 10 and checks whether any one of the authentication passwords 11 through 13 coincides with a password which is information entered from a host computer 100 via an interface 40 and the operation mode control section 30.

If the password coincides with the read-only authentication password 11, the write-only authentication password 12 or the read/write authentication password 13, the password verification section 20 outputs an authentication signal to the operation mode control section 30. According to the authentication signal, the operation mode control section 30 outputs an operation mode signal (read-only operation mode signal, write-only operation mode signal or read/write operation mode signal).

The controller 50, composed of a hard disk controller and a microcomputer, controls execution of an operation mode (read-only operation mode, write-only operation mode or read/write operation mode) according to the operation mode signal entered from the operation mode control section 30.

Further, the hard disk drive unit 1 includes a read/write circuit 60, a read/write amp 70, a voice coil motor 80 and a driver circuit 90.

Based on the operation mode signal entered from the operation mode control section 30 via the controller 50, the read/write circuit 60 executes read processing for read data which is read out from the magnetic disk 2 by using the magnetic head of the head assembly 3 through amplification by the read/write amp 70 and write processing for write data input from the controller 50 through amplification by the read/write amp 70 to write the data to the magnetic disk 2 by using the magnetic head.

Based on a drive signal entered from the controller 50, the driver circuit 90 drives the voice coil motor 80 to control the seek operation of the head assembly 3 having the magnetic head attached thereto. Likewise, the driver circuit 90 drives the spindle motor 120.

The following provides a detailed description of how the hard disk drive unit according to the first embodiment operates.

Figure 2:
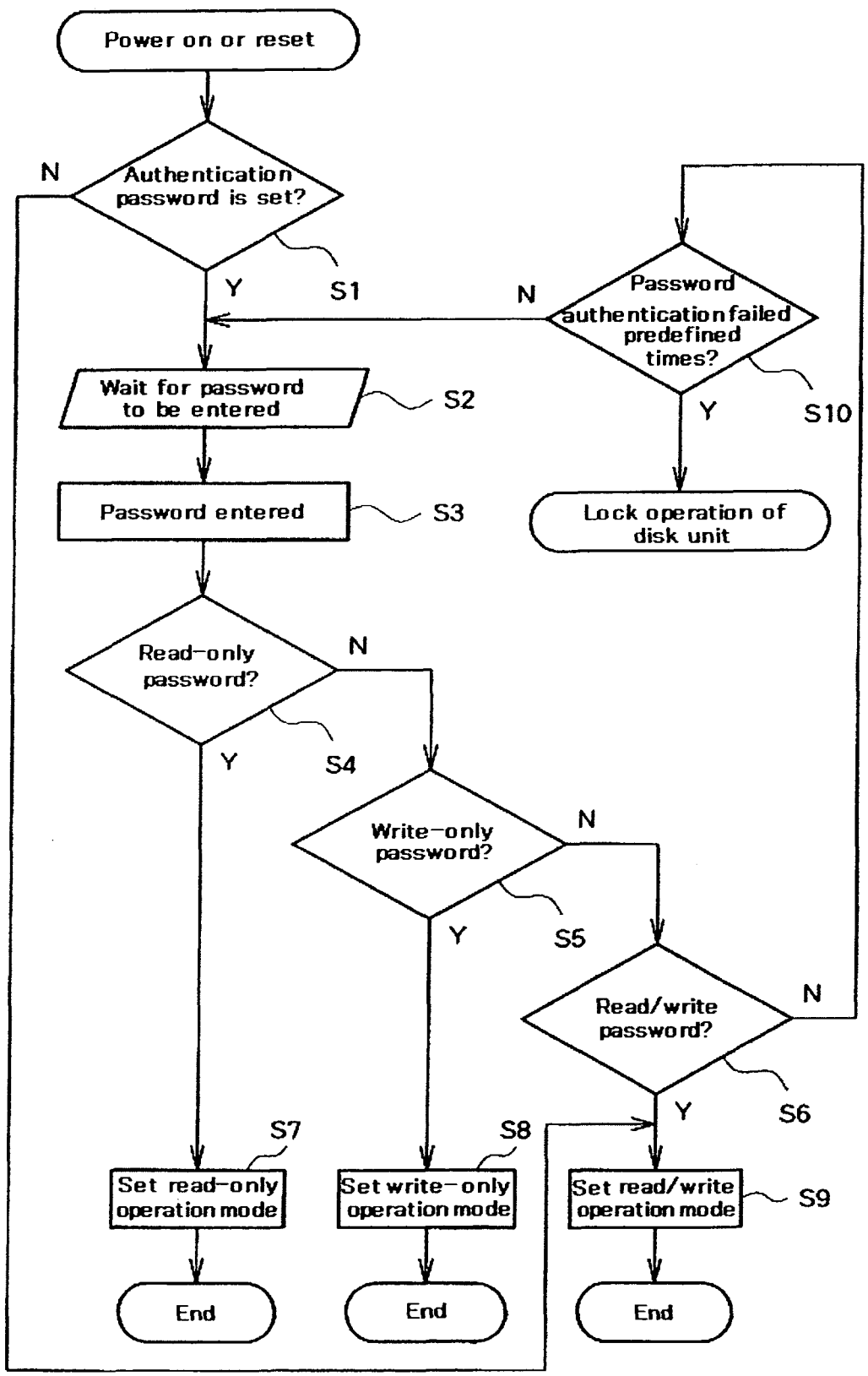
FIG. 2 is a flow chart of operation of the hard disk drive unit according to the first embodiment of the present invention.

If the hard disk drive unit 1 is powered on or reset, operations according to the flow chart shown in FIG. 2 are performed.

Upon power on or reset, the controller 50 determines whether the authentication passwords 11 through 13 are being set in the authentication password storage section 10 in step 1. If any one of the authentication passwords 11 through 13 is set (YES), the process proceeds to step S2. In step S2, the password verification section 20 waits for a password to be entered from the host computer 100. After that, the process proceeds to step S3. If any one of the authentication passwords 11 through 13 is not set (NO), the process proceeds to step S9. In step S9, the hard disk drive unit 1 is set for the read/write operation mode, and the authentication process is terminated.

If a password is entered into the password verification section 20 in step 3, the password verification section 20 judges whether the password coincides with the read-only authentication password 11 in the authentication password storage section 10.

If the password coincides with the read-only authentication password (YES), the read-only operation mode signal is entered into the controller 50 from the operation mode control section 30. In this case, in step S7, the hard disk drive unit 1 is set for the read-only operation mode, and the authentication process is terminated. If the password does not coincide with the read-only authentication password (NO), the process proceeds to step S5. In step S5, the password verification section 20 judges whether the password coincides with the write-only authentication password 12 in the authentication password storage section 10.

In step S5, if the password coincides with the write-only authentication password 12, the write-only operation mode signal is entered into the controller 50 from the operation mode control section 30. In this case, in step 8, the hard disk drive unit 1 is set for the write-only operation mode, and the authentication process is terminated. If the password does not coincide with the write-only authentication password 12 (NO), the process proceeds to step S6. In step S6, password verification section 20 judges whether the password coincides with the read/write authentication password 13 in the authentication password storage section 10.

In step S6, if the password coincides with the read/write authentication password 13 (YES), the read/write operation mode signal is entered into the controller 50 from the operation mode control section 30. In this case, in step 9, the hard disk drive unit 1 is set for the read/write operation mode, and the authentication process is terminated. If the password does not coincide with the read/write authentication password 13 (NO), the process proceeds to step S1. In step S10, the controller 50 judges whether the password authentication has failed a predefined number of times (for example three times). If the password authentication has failed the predefined number of times (YES), the operation lock signal is entered into the controller 50 from the operation mode control section 30. In this case, the operation of the hard disk drive unit 1 is maintained in a locked state. If the password authentication has not failed the predefined number of times (NO), the process goes back to step S2 to wait a password to be entered and the steps from step S2 are repeated.

As mentioned above, the hard disk drive unit 1 according to the present embodiment has a configuration in which the authentication password storage section 10 is mounted in the hard disk drive unit 1 and the authentication passwords 11 through 13 are stored in the authentication password storage section 10.

Therefore, in the case where the hard disk drive unit 1 is lent at a rental store, it is possible to permit a user (borrower) to execute only the read-only operation mode by giving only the read-only password to the user although the hard disk drive unit 1 has a plurality of operation modes.

This makes it possible to prevent not only illegal actions including erasing content stored in the hard disk drive unit 1 and storing other content in the hard disk drive unit 1 from being taken, but also prevents third parties other than a borrower from accessing data recorded on the magnetic disk 1. In addition, illegal access to the information processing system, which includes the hard disk drive unit 1 and the host computer 100, can be prevented. Thus, falsifying the access logs and other records can be prevented. Further, in a system where images obtained from a security video camera are recorded in the hard disk drive unit 1, it is possible to limit the users who are allowed to access the images for private information protection.

According to the first embodiment, the operation modes which the user is allowed to execute can be limited although the hard disk drive unit 1 has a plurality of operation modes (read-only operation mode, write-only operation mode and read/write operation mode). This can improve reliability of the hard disk drive unit 1.

Figure 3:
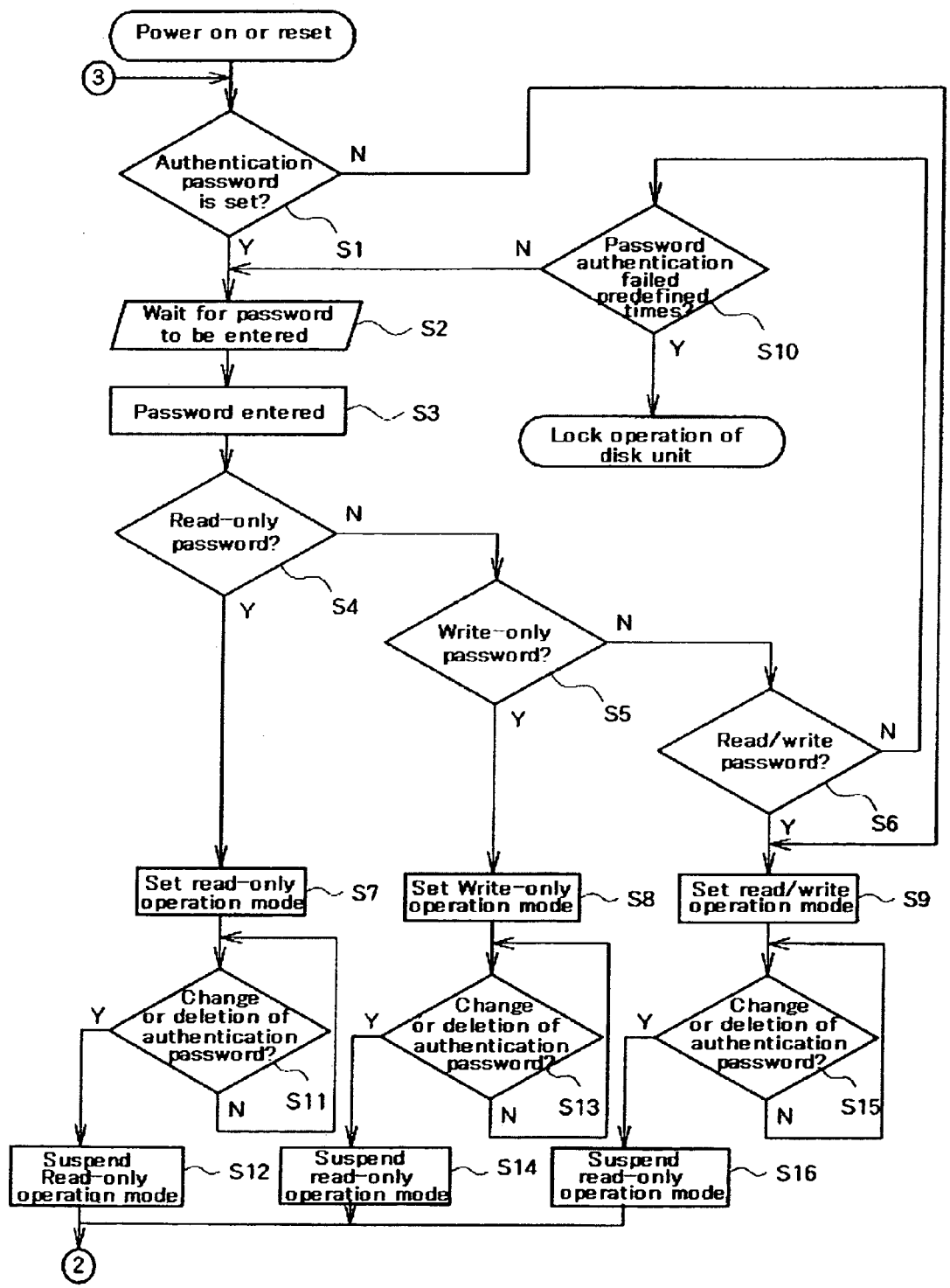
FIG. 3 is a first partial flow chart of operation of a second hard disk drive unit according to a second embodiment of the present invention.
Figure 4:
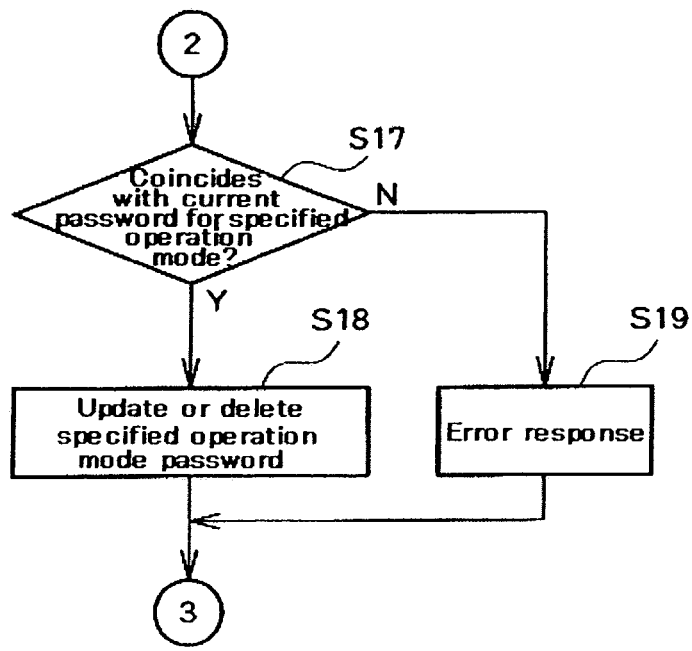
FIG. 4 is a second partial flow chart of the operation of the second hard disk drive unit according to the second embodiment of the present invention.

Then, FIGS. 3 and 4 are flow charts showing a second embodiment of the present invention. Note that the steps identical to those in the above-mentioned first embodiment are given the same reference numerals as in the first embodiment and its description is omitted.

Upon power on or reset, the present hard disk drive unit 1 according to the second embodiment operates according to the flow chart shown in FIGS. 3 and 4.

Figure 12:
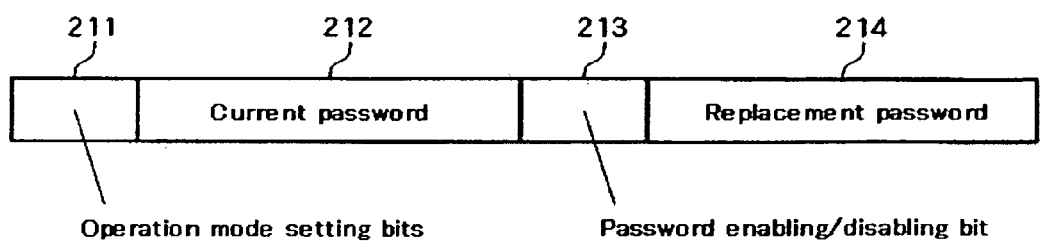
FIG. 12 shows an example of the configuration of password data to be entered to change an authentication password according to an embodiment of the present invention.

In steps S1 to S4, authentication processes are performed. In step S4, if a password coincides with the read-only authentication password, the process proceeds to step S7. In step S7, the hard disk drive unit 1 is set for the read-only operation mode. Then, the process proceeds to step S11 during execution of the read-only operation mode. In step S11, the controller 50 judges whether any one of the read-only authentication password 11, the write-only authentication password 12 and the read/write authentication password 13 is specified to be changed or deleted. If the authentication password is not specified to be changed or deleted (NO), step S11 is repeated to judge whether the other authentication password is specified to be changed/deleted. If one of the authentication passwords is specified to be changed or deleted (YES), the process proceeds to step S12, and the read-only operation mode stops. Then, in step S17 shown in FIG. 4, it is checked whether the user knows the currently-used authentication password in order to change the authentication password. By confirming that the user knows the currently-used authentication password, it can be determined that the user is entitled to change the authentication password. FIG. 12 shows an example of password data to change a password. Operation mode setting bits 211 indicate an operation mode for which the password is changed. The operation mode setting bits 211 may be omitted if a command is used to detect the operation mode. A currently-used password 212 is used to check whether the user is entitled. A replacement password 214 is update data. In addition, password enabling/disabling bit 213 can be used to delete the authentication password. If the password coincides with the current authentication password (YES) in step S17, the authentication password for the specified operation mode is changed in step S18. Here, the change process for changing the authentication password includes a deleting process for deleting the authentication password (resulting in no password set for the specified operation mode). If the password does not coincides with the current authentication password (NO) in step S17, an error is reported in step S19. Then, the process proceeds back to step S1 to repeat the process from step S1. In step S2, it is judged whether an authentication password is set.

In addition, if the hard disk drive unit 1 is set for the write-only operation mode in step S8, the process proceeds to step S13 during execution of the write-only operation mode. In step S13, the controller 50 judges whether any one of the read-only authentication password 11, write-only authentication password 12 and read/write authentication password 13 is specified to be changed. If any of the authentication passwords is not specified to be changed or deleted (NO), step S13 is repeated to judge whether any one of the authentication passwords is specified to be changed or deleted. If one of the authentication passwords is specified to be changed or deleted (YES), the process proceeds to step S14. In step S14, the read-only operation mode stops. Then, after steps S17 through S19 of FIG. 4 are performed, the process proceeds back to step S1 to repeat the process from step S1 in which it is judged whether an authentication password is set.

Further, if the hard disk drive unit 1 is set for the read/write operation mode in step S9, the process proceeds to step S15 during execution of the read/write operation mode. In step S15, the controller 50 judges whether any one of the read-only authentication password 11, write-only authentication password 12 and read/write authentication password 13 is specified to be changed. If any of the authentication passwords is not specified to be changed or deleted (NO), step S15 is repeated to judge whether any one of the authentication passwords is specified to be changed/deleted. If any one of the authentication passwords is specified to be changed/deleted (YES), the process proceeds to step S16. In step S16, the read/write operation mode stops. Then, after steps S17 through S19 of FIG. 4 are performed, the process proceeds back to step S1 to repeat the process from step S1 in which it is judged whether an authentication password is set.

In such a configuration in the present embodiment, the hard disk drive unit 1 allows the user to change any of the authentication passwords 11 through 13 as necessary after one of the plural operation modes of the hard disk drive unit 1 is executed. Therefore, maintenance work, etc. can be performed more efficiently on the hard disk drive unit 1.

Figure 5:
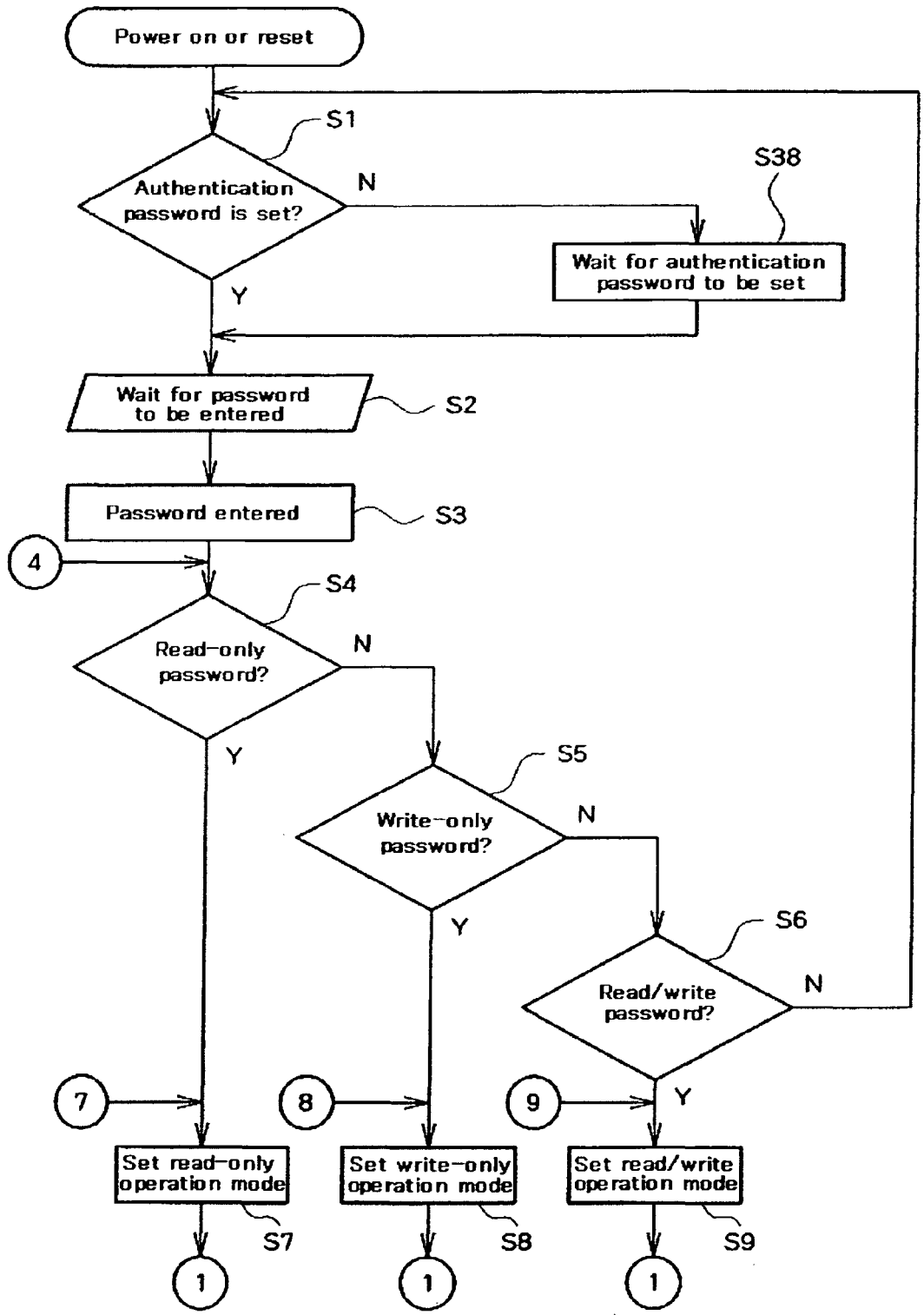
FIG. 5 is a first partial flow chart of operation of a hard disk drive unit according to third and fourth embodiments of the present invention.
Figure 6:
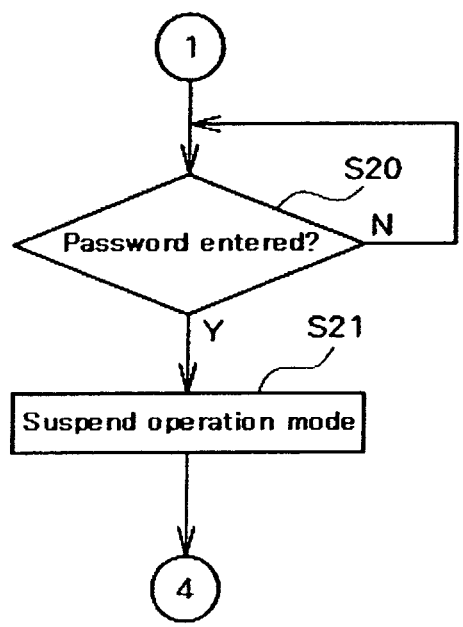
FIG. 6 is a second partial flow chart of the hard disk drive unit according to the third embodiment of the present invention.

Then, FIGS. 5 and 6 show a third embodiment of the present invention. Note that the steps identical to those in the above-mentioned first embodiment are given the same reference numerals as in the first embodiment and its description is omitted.

Upon power on or reset, the present hard disk drive unit 1 according to the third embodiment operates according to the flow chart shown in FIGS. 5 and 6.

If any of the authentication passwords 11 through 13 is not set yet in the authentication password storage section 10 (NO) in step S1, the process proceeds to step S38 to set at least one of the authentication passwords 11 through 13. This step is an example step in which an authentication password is necessary for use of the hard disk drive unit 1. Then, the process proceeds to step S2 to wait for a password to be entered. Upon entry, the subsequent authentication process is performed. In step S6, it is judged whether the password coincides with the read/write authentication password 13. If the password coincides with the read/write authentication password 13, the process proceeds back to step S1 to check whether any one of the authentication passwords 11 through 13 is set. Alternatively, this flow shown in the figure may be modified so that if there is no coincidence, the process proceeds back to step S2 to wait for a password to be entered for authentication.

If the hard disk drive unit 1 is set for the read-only operation mode in step S7, the process proceeds to step S20 during execution of the read-only operation mode.

In addition, if the hard disk drive unit 1 is set in step S8 to operate in the write-only operation mode, the process proceeds to step S20 during operation in this mode.

Further, if the hard disk drive unit 1 is set in step S9 to operate in the read/write operation mode, the process proceeds to step S20 during operation in this mode.

If a new password is not entered (NO) in step S20, step S20 is repeated to judge again whether a new password is entered. If a new password is entered (YES), the process proceeds to step S21. The entered new password may be any one of the read-only authentication password 11, the write-only authentication password 12 and the read/write authentication password 13. In step S21, the operation mode set in step S7, S8 or S9 is suspended. Then, the process proceeds to step S4 in which password verification section 20 judges whether the new password coincides with the read-only authentication password 11.

If the new password coincides with the read-only authentication password 11 (YES), the process proceeds back to step S7 to set the hard disk drive unit 1 again to operate in the read-only operation mode. Then, the subsequent authentication process is repeated during operation in this mode. If the password does not coincide with the read-only authentication password 11 (NO), the process proceeds to step S5 to judge whether the new password coincides with the write-only authentication password 12.

If the new password coincides with the write-only authentication password 12 (YES), the process proceeds to step S8 to set the hard disk drive unit 1 again to operate in the write-only operation mode. Then, the subsequent authentication process is performed during operation in this mode. If the new password does not coincide with the write-only authentication password 12 (NO), the process proceeds to step S6 to judge whether the new password coincides with the read/write authentication password 13.

If the new password coincides with the read/write authentication password 13 (YES), the process proceeds back to step S9 to set the hard disk drive unit 1 again to operate in the read/write operation mode. Then, the subsequent authentication process is repeated during operation in this mode. If the password does not coincide with the read/write authentication password 13 (NO), the process proceeds back to step S1 to repeat the authentication process.

Figure 7:
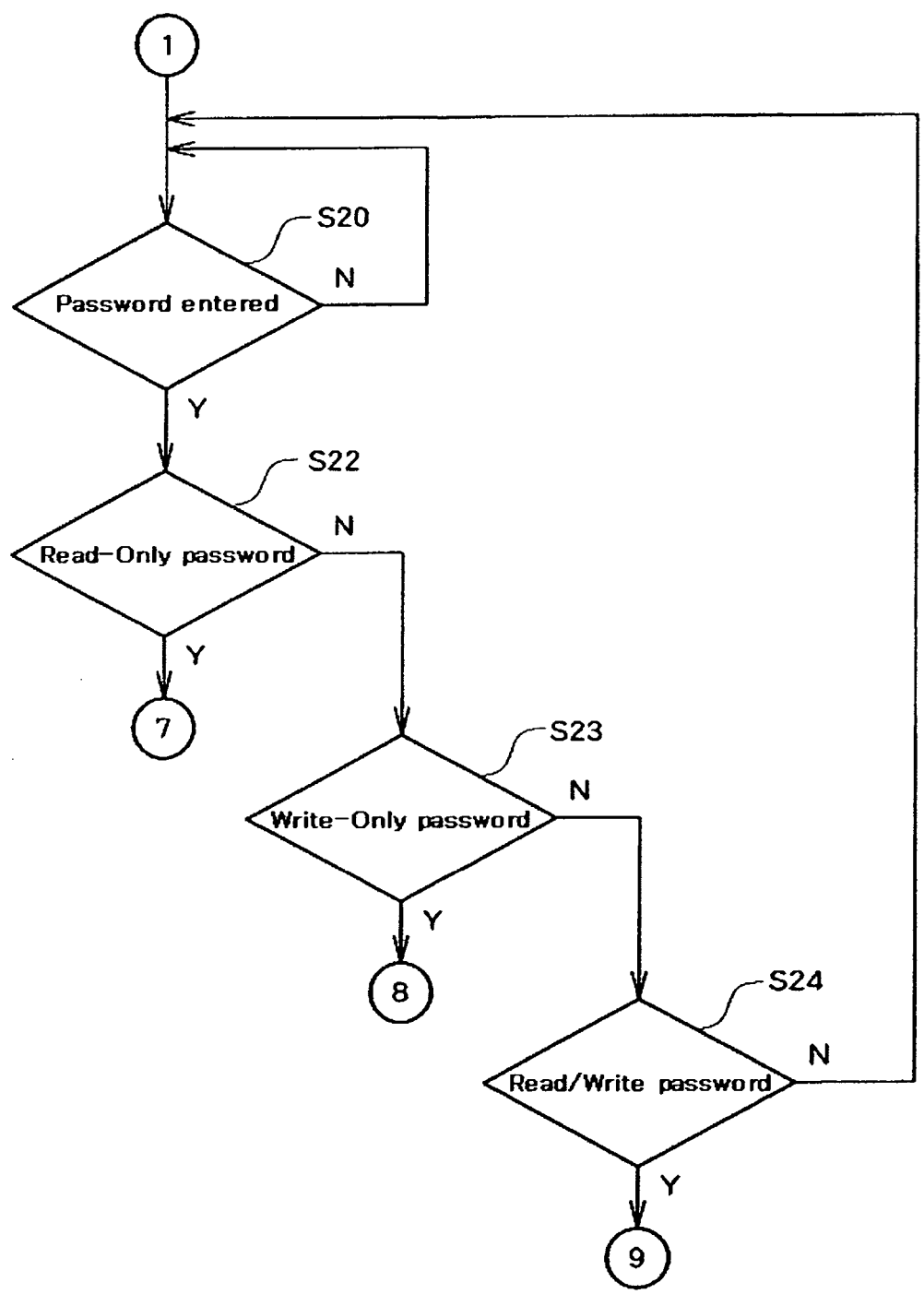
FIG. 7 is a third partial flow chart of the operation of the hard disk drive unit according to another configuration of the third embodiment of the present invention.

FIGS. 5 and 7 show another configuration of the third embodiment of the present invention. Upon power on or reset, the hard disk drive unit 1 operates according to the flow chart shown in FIGS. 5 and 7.

After the processing in steps S1 to S9 and step S38 is performed, the process proceeds to step S20.

If a new password is not entered in step S20 (NO), step S20 is repeated to check whether a new password is entered. If a new password is entered (YES), the process proceeds to step S22. The entered new password may be any one of the read-only authentication password 11, the write-only authentication password 12 and the read/write authentication password 13. In step S22, the password verification section 20 judges whether the new password coincides with the read-only authentication password 11.

If the new password coincides with the read-only authentication password 11 (YES), the process proceeds back to step S7 to set the hard disk drive unit 1 again to operate in the read-only operation mode. Then, the subsequent authentication process is performed during operation in this mode. If the password does not coincide with the read-only authentication password 11 (NO), the process proceeds to step S23 to judge whether the new password coincides with the write-only authentication password 12.

If the new password coincides with the write-only authentication password 12 (YES), the process proceeds back to step S8 to set the hard disk drive unit 1 again to operate in the write-only operation mode. Then, the subsequent authentication process is performed during operation in this mode. If the password does not coincide with the write-only authentication password 12 (NO), the process proceeds to step S23 to judge whether the new password coincides with the read/write authentication password 13.

If the new password coincides with the read/write authentication password 13 (YES), the process proceeds back to step S9 to set the hard disk drive unit 1 again to operate in the read/write operation mode. Then, the subsequent authentication process is performed during operation in this mode. If the password does not coincide with the read/write authentication password 13 (NO), the current operation mode remains unchanged and the process proceeds to back to step S20 to check again whether a new password is entered.

According to the present embodiment mentioned above, after the hard disk drive unit 1 is set to operate in one of the plural operation modes, it is possible to switch to another mode only by entering the corresponding password. Therefore, maintenance and other work can be performed more efficiently for the hard disk drive unit 1. In addition, the operation mode can be suspended during switching the operation mode in the embodiments. If the operation mode is suspended during switching it, it is important to operate the unit with the correct passwords when switching the operation mode. Trying to switch the operation mode without the correct passwords may result in difficulty setting the hard disk drive unit 1 to operate again.

Figure 8:
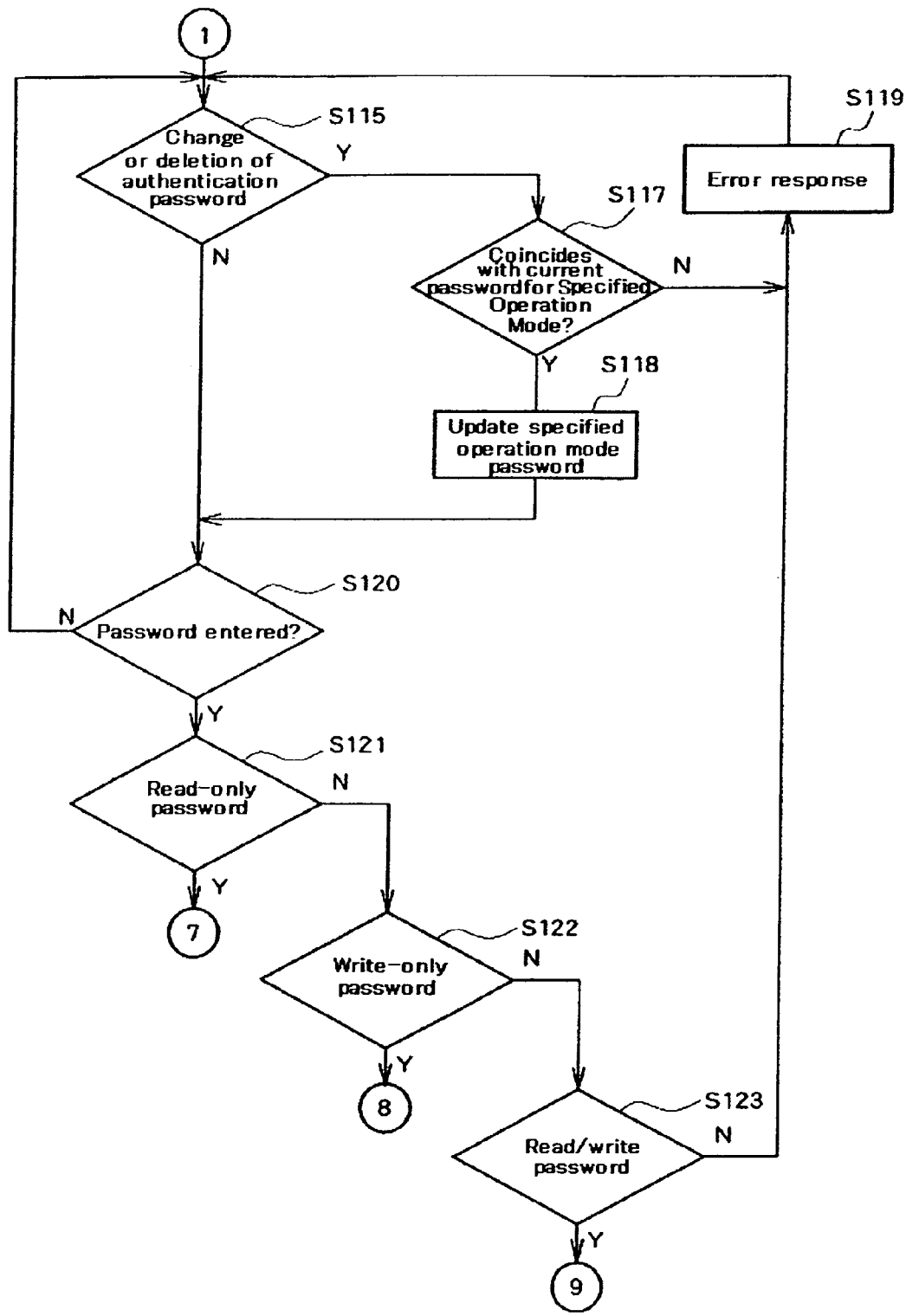
FIG. 8 is a second partial flow chart of the operation of the hard disk drive unit according to the fourth embodiment of the present invention.

Then, FIGS. 5 and 8 show a fourth embodiment of the present invention. Note that the steps identical to those in the above-mentioned second and third embodiments are given the same reference numerals as in the second and third embodiments and its description is omitted.

Upon power on or reset, the present hard disk drive unit 1 according to the fourth embodiment operates according to the flow chart shown in FIGS. 5 and 8.

If any of the authentication passwords 11 through 13 is not set yet in the authentication password storage section 10 (NO) in step S1, the process proceeds to step S38 to set at least one of the authentication passwords 11 through 13. Then, the process proceeds to step S2 to wait for a password to be entered before the subsequent authentication process is performed.

In steps S7 through S9, the corresponding operation modes are set respectively. That is, if the hard disk drive unit 1 is set in step S7 to operate in the read-only operation mode, the process proceeds to step S115 during operation in this mode. If the hard disk drive unit 1 is set in step S8 to operate in the write-only operation mode, the process proceeds to step S15 during operation in this mode. If the hard disk drive unit 1 is set in step S9 to operate in the read/write operation mode, the process proceeds to step S115 during operation in this mode.

In step S115, the controller 50 judges whether any authentication password is specified to be changed/deleted. If any authentication password is not specified to be changed/deleted (NO), the process proceeds to step S120. If an authentication password is specified to be changed/deleted (YES), the process proceeds to step S117 in which the user is requested to enter the current authentication password which is to be changed. This is for checking whether the user knows the current authentication password, that is, whether the user is entitled to change the authentication password. If the password does not coincide with the current authentication password (NO) in step S117, an error is reported in step 119 and the process proceeds back to step S115 to repeat the subsequent process. If the password coincides with the current authentication password (YES) in step S117, the authentication password for the specified operation mode is changed in step S118. Then, the process proceeds to step s120. Here, the authentication password to be changed may be any one of the read-only authentication password 11, the write-only authentication password 12 and the read/write authentication password 13. Also note that the changed authentication password will be used for verification after the next power on or reset. Further, note that in the present embodiment, the change process for changing the authentication password includes a deleting process for deleting the authentication password (resulting in no password set for the specified operation mode).

FIG. 12 shows an example of password data to be entered to change a password. Operation mode setting bits 211 indicate an operation mode for which the password is changed. A currently-used password 212 is used to check whether the user is entitled. A replacement password 214 is update data. In the present embodiment, password enabling/disabling bit 213 is either fixed to "enable" or omitted.

In step S120, it is judged whether a new password is entered. If a new password is not entered (NO), the process proceeds back to step S115 to repeat the authentication process to judge whether a password is to be changed. If a new password is entered (YES), the process proceeds to step S121. The new password entered to switch the operation mode may be any one of the read-only authentication password 11, the write-only authentication password 12 and the read/write authentication password 13. In step S121, the password verification section 20 judges whether the new password coincides with the read-only authentication password 11.

If the new password coincides with the read-only authentication password 11 (YES), the process proceeds back to step S7 to set the hard disk drive unit 1 to operate in the read-only operation mode. Then, the subsequent authentication process after step S7 is repeated during operation in this mode. If the password does not coincide with the read-only authentication password 11 (NO), the process proceeds to step S122 to judge whether the new password coincides with the write-only authentication password 12.

If the new password coincides with the write-only authentication password 12 (YES) in step S122, the process proceeds back to step S8 to set the hard disk drive unit 1 to operate in the write-only operation mode. Then, the subsequent authentication process after step S8 is repeated during operation in this mode. If the new password does not coincide with the write-only authentication password 12 (NO), the process proceeds to step S123 to judge whether the new password coincides with the read/write authentication password 13.

If the new password coincides with the read/write authentication password 13 (YES), the process proceeds back to step S9 to set the hard disk drive unit 1 to operate in the read/write operation mode. Then, the subsequent authentication process after step S9 is repeated during operation in this mode. If the password does not coincide with the read/write authentication password 13 (NO), an error is reported in step S119 and the process proceeds back to step S115 to repeat the process to check whether any authentication password is to be changed.

In such a configuration in the present embodiment, the hard disk drive unit 1 allows the user to change any of the authentication passwords 11 through 13 as necessary after one of the plural operation modes of the hard disk drive unit 1 is executed. In addition, once the hard disk drive unit 1 is set to operate in one of the plural operation modes, it is possible to switch to another mode only by entering the corresponding password. Therefore, maintenance and other work can be performed more efficiently for the hard disk drive unit 1.

Figure 9:
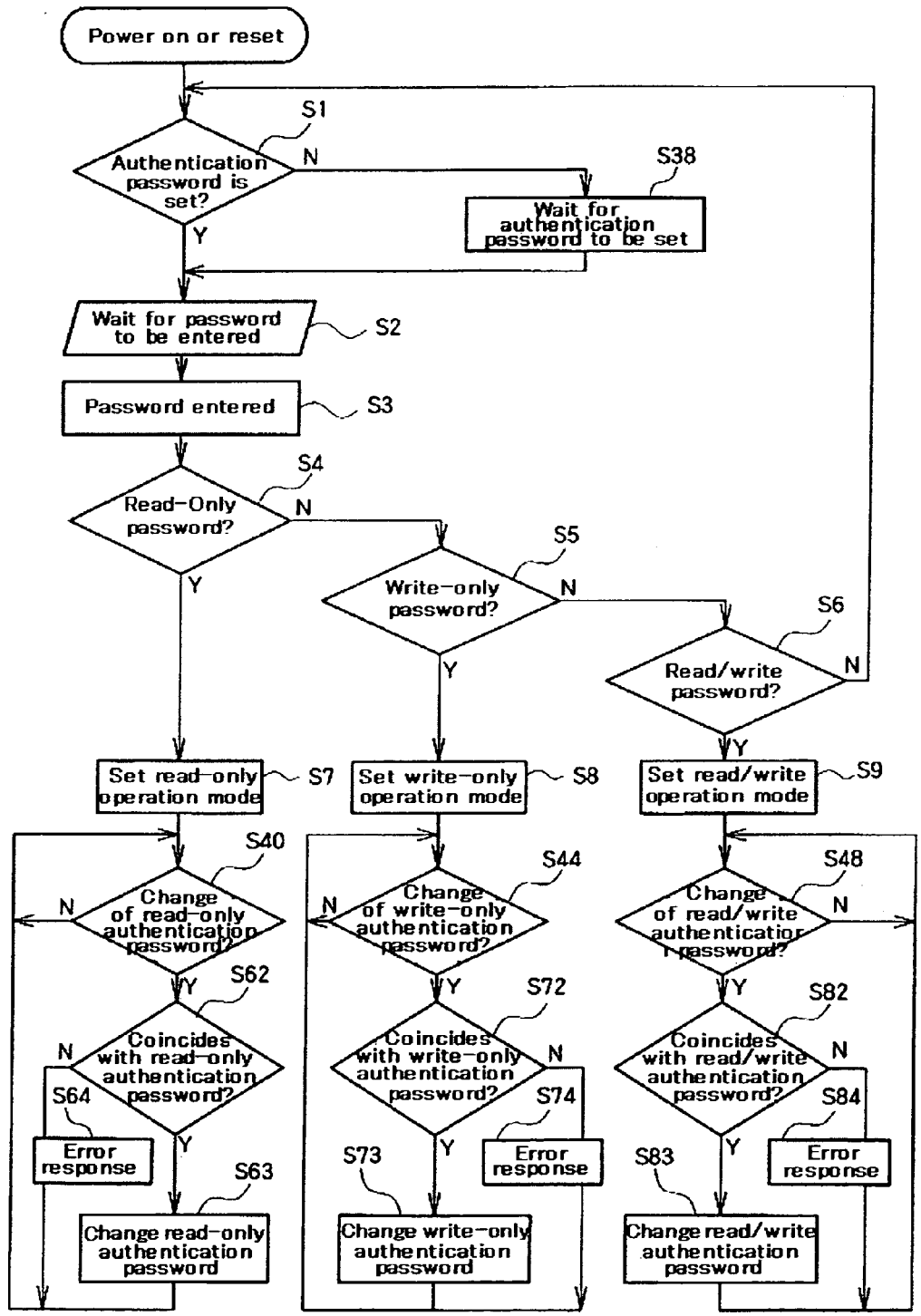
FIG. 9 is a flow chart of operation of a hard disk drive unit according to a fifth embodiment of the present invention.

Then, FIG. 9 shows a fifth embodiment of the present invention. Note that the steps identical to those in the first and third embodiments are given the same reference numerals as in the first and third embodiments and its description is omitted.

Upon power on or reset, the hard disk drive unit 1 according to the fifth embodiment operates according to the flow chart shown in FIG. 9.

In step S1, it is judged whether the authentication passwords are set and the subsequent steps of the authentication process is performed. Then, in step S7, S8 or S9, the hard disk drive unit 1 is set to operate in the read-only operation mode, the write-only operation mode or the read/write operation mode, respectively.

If the hard disk drive unit 1 is set in step S7 to operate in the read-only operation mode, the process proceeds to step S40 during operation in this mode. In step S40, the controller 50 judges whether the read-only authentication password 11 is to be changed. If the read-only authentication password 11 is not to be changed (NO), step S40 is repeated to judge whether the read-only authentication password 11 is to be changed. Here, changing another authentication password other than the read-only authentication password 11 also results in the same judgment (NO). If the read-only authentication password 11 is to be changed (YES), the process proceeds to step S62.

In step S62, it is judged whether a password entered coincides with the currently-set read-only authentication password 11 in order to change the read-only authentication password 11. This is to check whether the user knows the currently-set read-only authentication password 11, that is, whether the user is entitled to change the authentication password. The data to be entered to change a password may be configured as shown in FIG. 12. From the configuration of FIG. 12, operation mode setting bits 211 and password enabling/disabling bit 213 may be omitted. This is because the authentication password for the current operation mode is changed and any other authentication passwords are not deleted. If the password entered in step S62 coincides with the current read-only authentication password 11 (YES), the read-only authentication password 11 is changed without suspending this operation mode in step S63. Then, the process proceeds back to step S40 to judge again whether the read-only authentication password 11 is to be changed. Note that the changed read-only authentication password 11 will be used for verification after the next power on or reset. If the password entered in step S62 does not coincide with the current read-only authentication password 11 (NO), an error is reported without suspending the operation mode in step S64. Then, the process proceeds back to step 40 to judge again whether the read-only authentication password is to be changed.

If the hard disk drive unit 1 is set in step S8 to operate in the write-only operation mode, the process proceeds to step S44 during operation in this mode. In step S44, the controller 50 judges whether the write-only authentication password 12 is to be changed. If the write-only authentication password 12 is not to be changed (NO), step S44 is repeated to judge whether the write-only authentication password 12 is to be changed. Here, changing another authentication password other than the write-only authentication password 12 also results in the same judgment (NO). If the write-only authentication password 12 is to be changed (YES), the process proceeds to step S72.

In step S72, it is checked whether a password entered coincides with the current write-only authentication password 12 in order to change the write-only authentication password 12. This is to check whether the user knows the current write-only authentication password 12, that is, whether the user is entitled to change the authentication password. The data to be entered to change the password is configured in the same manner as in step S62. If the password entered in step S72 coincides with the current write-only authentication password 12 (YES), the write-only authentication password 12 is changed without suspending this operation mode in step S73. Then, the process proceeds back to step S44 to judge again whether the write-only authentication password 12 is to be changed. Note that the changed write-only authentication password 12 will be used for verification after the next power on or reset. If the password entered in step S72 does not coincide with the current write-only authentication password 12 (NO), an error is reported without suspending the operation mode in step S74. Then, the process proceeds back to step S44 to judge again whether the write-only authentication password is to be changed.

If the hard disk drive unit 1 is set in step S9 to operate in the read/write operation mode, the process proceeds to step S48 during operation in this mode. In step S48, the controller 50 judges whether the read/write authentication password 13 is to be changed. If the read/write authentication password 13 is not to be changed (NO), step S48 is repeated to judge whether the read/write authentication password 13 is to be changed. Changing another authentication password other than the read/write authentication password 13 also results in the same judgment (NO). If the read/write authentication password 13 is to be changed (YES), the process proceeds to step S82.

In step S82, it is checked whether a password entered coincides with the current read/write authentication password 13 in order to change the read/write authentication password 13. This is to check whether the user knows the current read/write authentication password 13, that is, whether the user is entitled to change the authentication password. The data to be entered to change the password is configured in the same manner as in step S62. If the password entered in step S82 coincides with the current read/write authentication password 13 (YES), the read/write authentication password 13 is changed without suspending this operation mode in step S83. Then, the process proceeds back to step S48 to judge again whether the read/write authentication password 13 is to be changed. Note that the changed read/write authentication password 13 will be used for verification after the next power on or reset. If the password entered in step S82 does not coincide with the current read/write authentication password 13 (NO), an error is reported without suspending the operation mode in step S84. Then, the process proceeds back to step S48 to judge again whether the read/write authentication password is to be changed.

In such a configuration in the present embodiment, after the hard disk drive unit 1 is set to operate in one of its plural operation modes, only the password for the current operation mode is allowed to be changed. Since any password other than the password for the current operation mode cannot be changed, it is possible to more efficiently perform maintenance and other work for the hard disk drive unit 1 while properly protecting the passwords.

Figure 10:
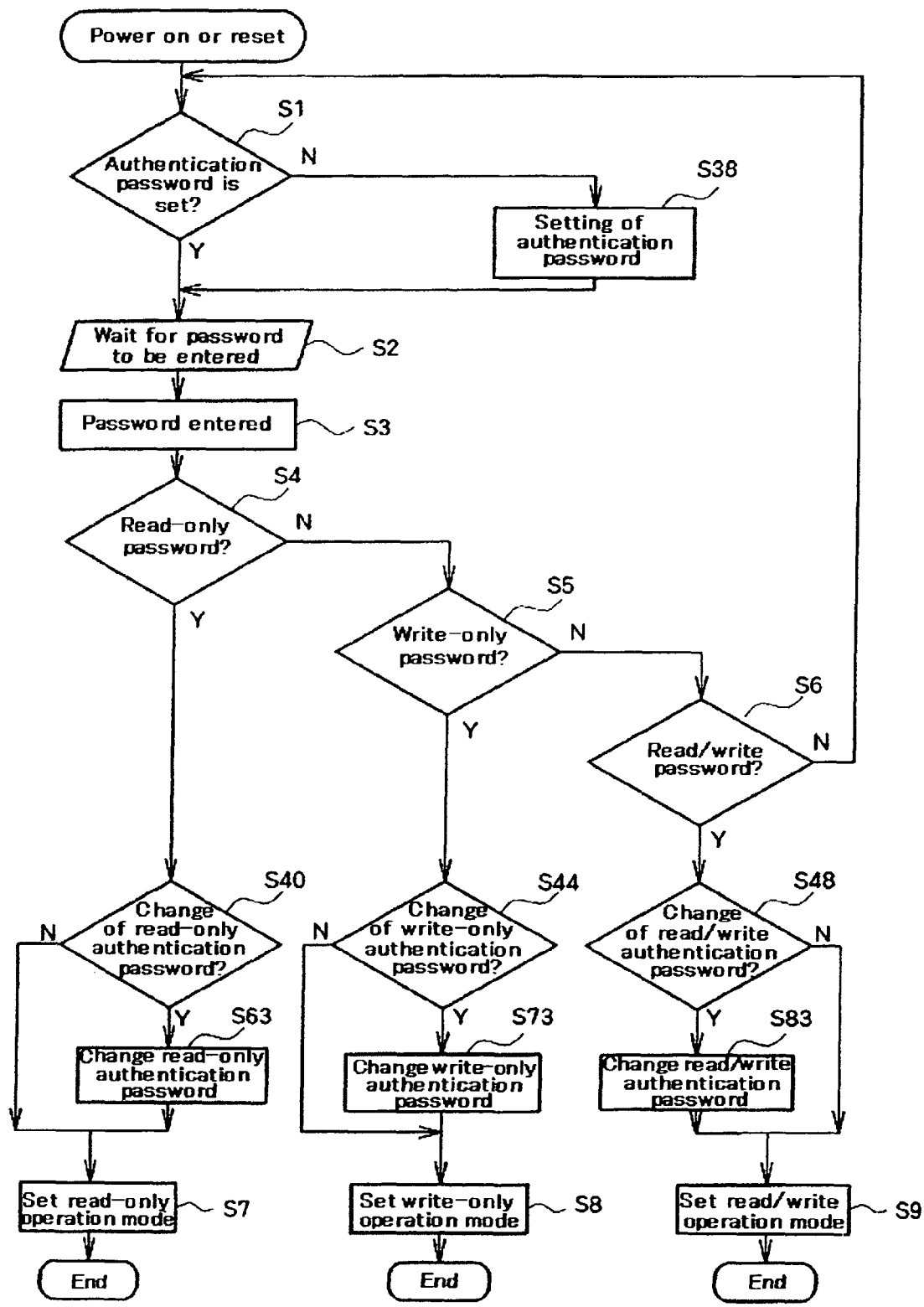
FIG. 10 is another flow chart of the operation of the disk drive unit according to the fifth embodiment of the present invention.

Then, FIG. 10 shows a modification of the fifth embodiment of the present invention. Note that the steps identical to those in the fifth embodiment are given the same reference numerals as in the fifth embodiment and its description is omitted.

In the present embodiment, if the hard disk drive unit 1 is powered on or reset, it operates according to a flow chart shown in FIG. 10.

In step S1, it is judged whether the authentication passwords are set. After step S38 is performed if necessary, the process proceeds to step S2. Then, after an authentication password is entered in step S3, the step 4 and subsequent authentication process are performed.

In step 4, the password verification section 20 judges whether the password coincides with the read-only authentication password 11 stored in the authentication password storage section 10. If the password does not coincide with the read-only authentication password (NO), the process proceeds to step S5. If the password coincides with the read-only authentication password (YES), the process proceeds to step S40. In step S40, it is judged whether the read-only authentication password 11 is to be changed. If the read-only authentication password 11 is to be changed (YES), the process proceeds to step S63. In this case, after the read-only authentication password 11 is changed in step S63, the process proceeds to step S7. Note that the changed read-only authentication password 11 will be used for verification after the next power on or reset. If the read-only authentication password 11 is not specified to be changed (NO) in step S40, the process directly proceeds to step S7. In step S7, the hard disk drive unit 1 is set to operate in the read-only operation mode, and the authentication process is terminated.

In step 5, the password verification section 20 judges whether the password coincides with the write-only authentication password 12 stored in the authentication password storage section 10. If the password does not coincide with the write-only authentication password (NO), the process proceeds to step S6. If the password coincides with the write-only authentication password (YES), the process proceeds to step S44. In step S44, it is judged whether the write-only authentication password 12 is to be changed. If the write-only authentication password 12 is to be changed (YES), the process proceeds to step S73. In this case, after the write-only authentication password 12 is changed in step S73, the process proceeds to step S8. Note that the changed write-only authentication password 12 will be used for verification after the next power on or reset. If the write-only authentication password 12 is not specified to be changed (NO) in step S44, the process directly proceeds to step S8. In step S8, the hard disk drive unit 1 is set to operate in the write-only operation mode, and the authentication process is terminated.

In step 6, the password verification section 20 judges whether the password coincides with the read/write authentication password 13 stored in the authentication password storage section 10. If the password does not coincide with the read/write authentication password (NO), the process proceeds to step S1 to be repeated. If the password coincides with the read/write authentication password (YES), the process proceeds to step S48. In step S48, it is judged whether the read/write authentication password 13 is to be changed. If the read/write authentication password 13 is to be changed (YES), the process proceeds to step S83. In this case, after the read/write authentication password 13 is changed in step S83, the process proceeds to step S9. Note that the changed read/write authentication password 13 will be used for verification after the next power on or reset. If the read/write authentication password 13 is not specified to be changed (NO) in step S48, the process directly proceeds to step S9. In step S9, the hard disk drive unit 1 is set to operate in the read/write operation mode, and the authentication process is terminated.

In such a configuration in the present embodiment, immediately after the password entered by the user is judged to coincide with an authentication password for one of the plural operation modes of the hard disk drive unit 1, the user is allowed to change the authentication password. This makes it possible not only to lower the possibility of the authentication passwords being falsified but also to simplify the process since the steps (S17, S62, S72, S82 and S117) for verification with the current authentication passwords are not necessary.

Figure 11:
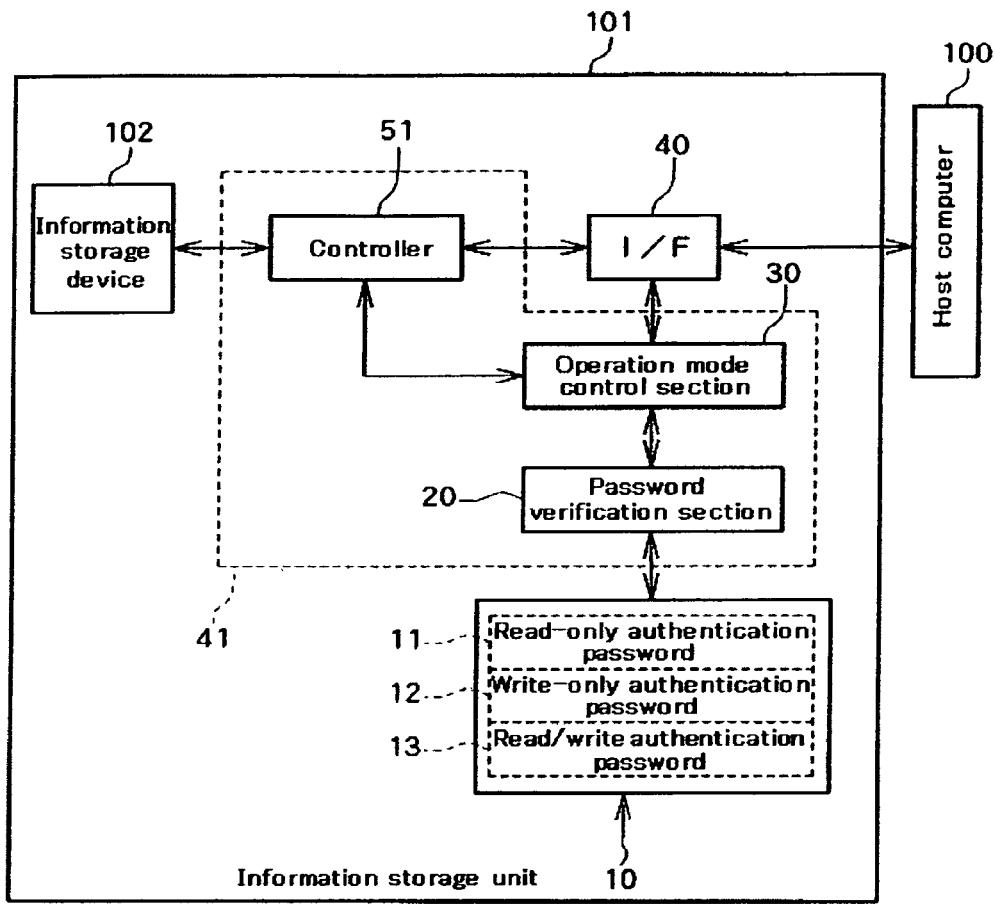
FIG. 11 is a block diagram of an information storage unit according to an embodiment of the present invention.

FIG. 11 shows an information storage unit according to an embodiment of the present invention. This embodiment is described below in detail with reference to the configuration of the information storage unit shown of FIG. 11. Note that the functions identical to those in the aforementioned first embodiment are given the same reference numerals as in the first embodiment and its description is omitted.

An information storage unit 101 according to the present embodiment, as shown in FIG. 11, includes an information storage device 102 which is an information storage medium, a control device 41, an interface 40 to exchange information with a host computer 100, and an authentication password storage section 10 which is a storage section for authentication. The control device 41 includes a password verification section 20 which is a section for verification, an operation mode control section 30 and a controller 51. The control device 41 controls the operation modes (read-only operation mode, write operation mode, read/write operation mode) which are performed to the information storage device 102.

The information storage device 102 and the authentication password storage section 10 are composed of, for example, a flash memory. In this flash memory, user data, a read-only authentication password 11 for the read-only operation mode, a write-only authentication password 12 for the write-only operation mode, and a read/write authentication password 13 for the read/write operation mode are stored. Note that the read-only authentication password 11, write-only authentication password 12 and read/write authentication password 13 (hereinafter referred collectively to as "authentication passwords 11 through 13") correspond to "authentication information" mentioned in "Claims". The authentication passwords 11 through 13 can be stored in the authentication password storage section 10 by preparing an authentication password setting command or the like and executing the command. To protect the authentication passwords from illegal access and falsification, the configuration of the authentication password storage section 10 and that of the control device 41 should be tamper-resistant.

The password verification section 20 reads out the authentication passwords 11 through 13 from the authentication password storage section 10 and checks whether any one of the authentication passwords 11 through 13 coincides with a password which is information entered from a host computer 100 via the interface 40 and the operation mode control section 30.

If the password coincides with the read-only authentication password 11, write-only authentication password 12 or read/write authentication password 13, the password verification section 20 outputs an authentication signal to the operation mode control section 30. According to the authentication signal, the operation mode control section 30 outputs an operation mode signal (read-only operation mode signal, write-only operation mode signal or read/write operation mode signal).

The controller 51 comprises a hard disk controller and a microcomputer. With respect to accessing information stored in the information storage device 102 in response to an information access request from the host computer 100, the controller 51 properly controls execution of an operation mode (read-only operation mode, write-only operation mode or read/write operation mode) according to the operation mode signal entered from the operation mode control section 30.

The information storage unit 101 can realize the same functions and operations as in the flow charts for the hard disk drive devices according to the above-mentioned embodiments.

Thus, embodiments of the present invention are also applicable to such memory devices as the information storage unit 101. In the information storage unit 101, the operation modes (read-only operation mode, write-only operation mode and read/write operation mode) which the user is allowed to execute can be limited by means of passwords given to the user.

The present invention is not limited to the specific embodiments described above. Although each embodiment uses a flash memory to constitute the authentication storage section which stores authentication passwords, for example, a magnetic disk may be used to constitute the authentication storage section. In addition, authentication passwords may be biometric information unique to a user. Further, without departing from the spirit of the present invention, various changes may be made to the embodiments described above in detail. In the aforementioned flow charts, various changes may be made. For example, it is possible to change the order of the authentication password verification steps S4, S5 and S6. It is also possible to combine the third embodiment of the present invention with the fifth embodiment, combine the fourth embodiment with the other fifth embodiment, and so on. In addition, processing in the authentication password verification steps S4, S5 and S6 may be changed such that verification of authentication passwords is performed when an actual operation mode coincides with an operation mode specified by the operation mode setting field 211.

What is claimed is:
1. A disk unit comprising:
a disk-shaped recording medium;
a head assembly that reads and writes information from and to the recording medium;
a control device that controls operation modes for reading and writing on the recording medium performed by the head assembly; and
an authentication storage section for storing authentication information in which each operation mode is given unique authentication information;
wherein the control device comprises:
a verification section that reads out the authentication information from the authentication storage section, compares each authentication information with input information entered via an interface by using a pre- defined method, checks whether each authentication information coincides with the input information, and outputs an authentication signal when one of the authentication information coincides with the input information, and increases a failed input information number when each authentication information does not coincide with the input information;

an operation mode control section that outputs an operation mode signal corresponding to the authentication signal that is supplied from the verification section when the corresponding authentication information coincides with the input information, and outputs an operation lock signal when the failed input information number exceeds a threshold number; and a controller that controls execution of the operation mode according to an operation mode signal that is supplied from the operation mode control section, locks the operation mode when the operation lock signal is received from the operation mode control section determines whether the authentication information is specified to be changed, determines whether a reset password coincides with the authentication information for the operation mode when the authentication information is specified to be changed or deleted, and updates the authentication information with a new password and suspends the operation mode when the reset password coincides with the authentication information for the operation mode.

2. The disk unit according to claim 1, wherein the operation modes are a read-only operation mode, a write-only operation mode and a read/write operation mode.

3. A disk unit according to claim 1 wherein the authentication storage section is a flash memory.

4. A disk unit according to claim 1 wherein the authentication storage section is the recording medium.

5. A disk unit according to claim 1 wherein:
authentication information stored in the authentication storage section is capable of being changed;
the verification section, if the authentication information stored in the authentication storage section is changed, compares the changed authentication information with input information entered via the interface by using a predefined method; and
the controller, if the authentication information stored in the authentication storage section is changed, controls execution of the operation mode based on a result of comparison with the changed authentication information.

6. A disk unit according to claim 1 wherein:
if new input information is entered via an interface during execution of a predefined operation mode, the verification section compares the newly input information with the authentication information stored in the verification section by using a predefined method;
if the authentication information coincides with the input information, the operation mode control section outputs a new operation mode signal corresponding to an authentication signal that is supplied from the verification section; and
the controller controls execution of the operation mode according to the new operation mode signal that is supplied from the operation mode control section.

7. A disk unit according to claim 1 wherein:
the recording medium is a magnetic disk.

8. An information storage unit comprising: a non-transitory readable and writable information recording medium; a control device that controls operation modes for reading and writing on the recording medium; and
an authentication storage section for storing authentication information in which each operation mode is given unique authentication information;
wherein the control device comprises:
a verification section which reads out the authentication information from the authentication storage section, compares each authentication information with input information entered via an interface by using a predefined method and checks whether each authentication information coincides with the input information;
an operation mode control section that outputs an operation mode signal corresponding to an authentication signal that is supplied from the verification section when the corresponding authentication information coincides with the input information; and
a controller that controls execution of the operation mode according to an operation mode signal that is supplied from the operation mode control section, suspends the operation mode when new input information is entered via the interface, controls execution of a new operation mode when the verification section determines that the new input information coincides with one of the authentication information, determines whether the authentication information is specified to be changed, determines whether a reset password coincides with the authentication information for the operation mode when the authentication information is specified to be changed or deleted, and updates the authentication information with a new password and suspends the operation mode when the reset password coincides with the authentication information for the operation mode.

9. The information storage unit according to claim 8, wherein the operation modes are a read-only operation mode, a write-only operation mode and a read/write operation mode.

10. An information storage unit comprising:
a readable and writable information recording medium;
a control device that controls operation modes for reading and writing on the recording medium; and
an authentication storage section for storing authentication information in which each operation mode is given unique authentication information;
wherein the control device comprises:
a verification section which reads out the authentication information from the authentication storage section, compares each authentication information with a password entered via an interface and checks whether the password coincides with one of the authentication information;
an operation mode control section that outputs an operation mode signal corresponding to an authentication signal that is supplied from the verification section when the password coincides with the one of the authentication information; and
a controller that controls execution of the operation mode according to an operation mode signal that is supplied from the operation mode control section, determines whether the authentication information is specified to be changed, determines whether a reset password coincides with the authentication information for the operation mode when the authentication information is specified to be changed or deleted, and updates the authentication information with a new password and suspends the operation mode when the reset password coincides with the authentication information for the operation mode.

11. The information storage unit according to claim 10, wherein the operation modes are a read-only operation mode, a write-only operation mode and a read/write operation mode.

\* \* \* \* \*